United States Patent
Kangas et al.

(10) Patent No.: US 9,928,154 B2
(45) Date of Patent: Mar. 27, 2018

(54) LEVELING STRESS FACTORS AMONG LIKE COMPONENTS IN A SERVER

(71) Applicant: Lenovo Enterprise Solutions (Singapore) Pte. Ltd., Singapore (SG)

(72) Inventors: Paul D. Kangas, Raleigh, NC (US); Daniel M. Ranck, Apex, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 141 days.

(21) Appl. No.: 14/993,530

(22) Filed: Jan. 12, 2016

(65) Prior Publication Data

US 2017/0199801 A1    Jul. 13, 2017

(51) Int. Cl.
*G06F 11/34* (2006.01)
*G06F 11/00* (2006.01)

(52) U.S. Cl.
CPC ........ *G06F 11/3495* (2013.01); *G06F 11/008* (2013.01)

(58) Field of Classification Search
CPC ... G06F 9/5038; G06F 11/008; G06F 11/3495
See application file for complete search history.

(56) References Cited

U.S. PATENT DOCUMENTS

| | | | | |
|---|---|---|---|---|
| 8,516,343 B2 * | 8/2013 | Flynn | ............. | G06F 11/108 714/773 |
| 9,652,394 B2 * | 5/2017 | Agarwal | ............. | G06F 12/0842 |
| 2009/0288092 A1 * | 11/2009 | Yamaoka | ............. | G06F 9/5033 718/104 |
| 2011/0265090 A1 * | 10/2011 | Moyer | ............. | G06F 1/3203 718/103 |
| 2012/0036398 A1 * | 2/2012 | Moyer | ............. | G06F 9/505 714/48 |
| 2013/0073822 A1 * | 3/2013 | Sandel | ............. | G06F 11/3433 711/162 |
| 2013/0145079 A1 * | 6/2013 | Lee | ............. | G06F 12/0246 711/103 |
| 2014/0359350 A1 * | 12/2014 | Plank | ............. | G06F 9/5027 714/10 |

* cited by examiner

*Primary Examiner* — Joseph R Kudirka
(74) *Attorney, Agent, or Firm* — Jeffrey L. Streets

(57) ABSTRACT

A method and computer program product for causing a processor to perform the method are provided. The method includes monitoring a plurality of operating parameters for each of multiple components of a compute node, wherein the multiple components have the same component type, and determining a stress factor score for each of the multiple components, wherein the stress factor score is a function of the plurality of operating parameters. The method further includes reducing use of a first component from among the multiple components, wherein the first component has a stress factor score that is greater than the stress factor score for any of the other components of the same component type. Optionally, the method may prioritize use of each of the multiple components in an order of ascending stress factor score.

20 Claims, 2 Drawing Sheets

LEVELING STRESS FACTORS AMONG LIKE COMPONENTS IN A SERVER

BACKGROUND

Field of the Invention

The present invention relates to methods for extending time to failure for components in a server.

Background of the Related Art

A datacenter may contain and facilitate the use of a large number of computer servers or compute nodes. Each compute node includes a large number of individual components that support the compute node in performing a workload. The overall capacity of a compute node is a function of the capacity and the number of the individual components.

When one of the individual components fails or experiences a high error rate, the overall capacity of the compute node declines. At some point it may be necessary to replace the damaged component in order to regain the full capacity or functionality of the compute node. Such replacement causes the compute node to be taken out of service for a period of time and imposes a cost of the replacement component and a cost of labor to replace the component.

One approach to reducing component failures is to design more robust components having an enhanced reliability and an extended life. However, such components are generally more expensive and the system within which the component is installed will generally become obsolete after a period of years. Another approach is to provide redundant components so that a failure does not lead to loss of data or system downtime. However, the extra components needed to provide redundancy similarly increase the cost of the system and a failed component must still be replaced in order to maintain the same level of redundancy.

BRIEF SUMMARY

One embodiment of the present invention provides a method comprising monitoring a plurality of operating parameters for each of multiple components of a compute node, wherein the multiple components have the same component type, and determining a stress factor score for each of the multiple components, wherein the stress factor score is a function of the plurality of operating parameters. The method further comprises reducing use of a first component from among the multiple components, wherein the first component has a stress factor score that is greater than the stress factor score for any of the other components of the same component type.

Another embodiment of the present invention provides a computer program product comprising a non-transitory computer readable storage medium having program instructions embodied therewith, the program instructions being executable by a processor to cause the processor to perform a method. The method comprises monitoring a plurality of operating parameters for each of multiple components of a compute node, wherein the multiple components have the same component type, and determining a stress factor score for each of the multiple components, wherein the stress factor score is a function of the plurality of operating parameters. The method further comprises reducing use of a first component from among the multiple components, wherein the first component has a stress factor score that is greater than the stress factor score for any of the other components of the same component type.

DETAILED DESCRIPTION

Figure 1:
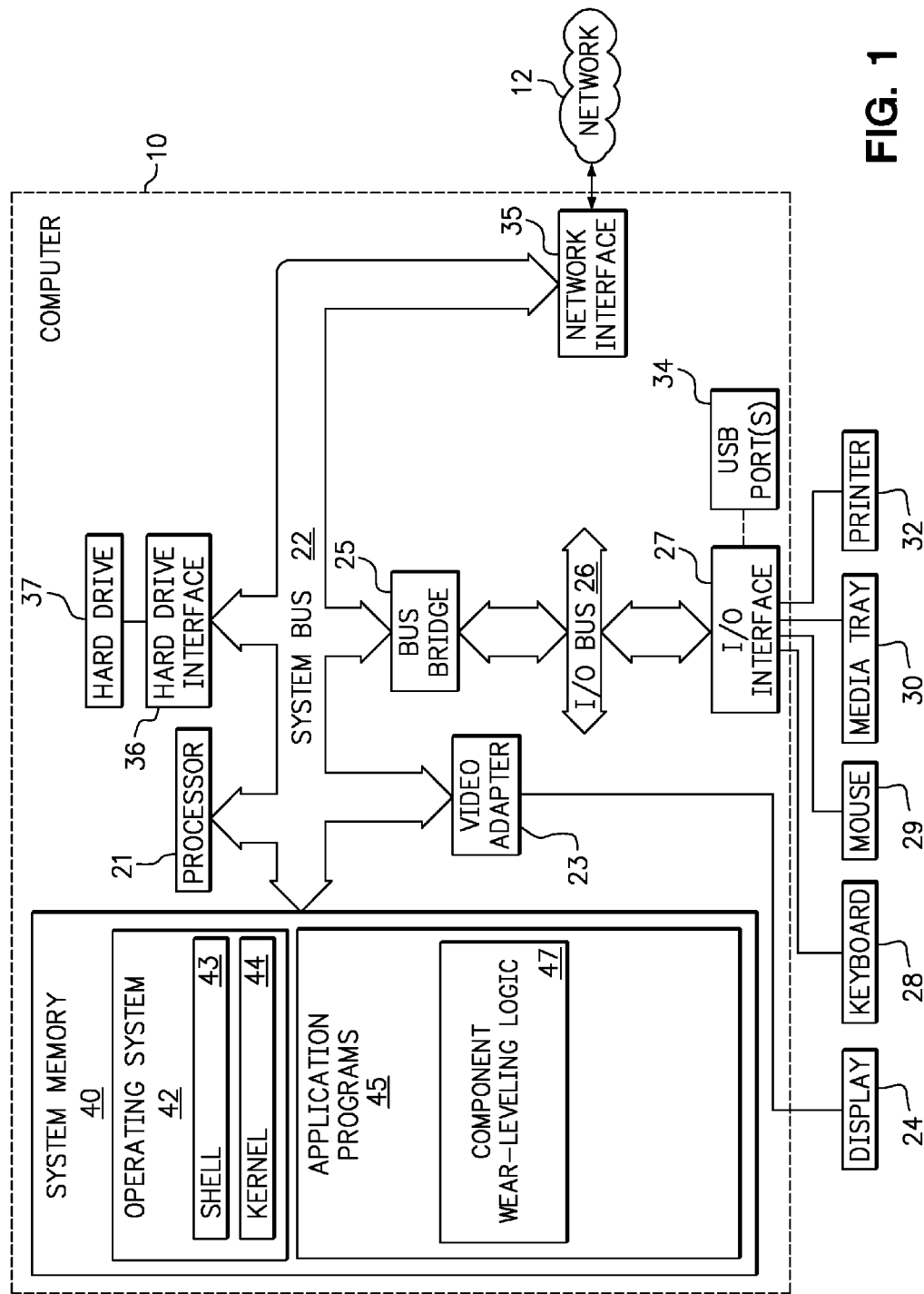
FIG. 1 is a diagram of a compute node that is capable of implementing the methods of the present invention.

One embodiment of the present invention provides a method comprising monitoring a plurality of operating parameters for each of multiple components of a compute node, wherein the multiple components have the same component type, and determining a stress factor score for each of the multiple components, wherein the stress factor score is a function of the plurality of operating parameters. The method further comprises reducing use of a first component from among the multiple components, wherein the first component has a stress factor score that is greater than the stress factor score for any of the other components of the same component type.

Depending upon the component, the plurality of operating parameters may be selected from on/off cycles, thermal average, read/write cycles, usage time (i.e., duration of "On" time, correctable error count, uncorrectable error count, memory training time during power-on self-test, and memory training error count during power-on self-test. The plurality of operating parameters may be monitored by the operating system software, a management module, or a combination thereof. Non-limiting examples of a management module include a baseboard management controller (BMC) and a unified extensible firmware interface (UEFI).

The compute node may have one or more component types for which there are multiple components. For example, the compute node may include multiple components of a component type selected from processors, memory modules, hard disk drives and combinations thereof. Often, a compute node may have multiple processors, multiple memory modules, and multiple hard disk drives. Accordingly, the methods of the present invention may be independently applied to the processors, memory modules and hard disk drives. In various embodiments, the component type is a pluggable component type, such as an expansion card or a memory module that may be plugged into a connector socket on a motherboard or a processor that may be received in a processor socket (i.e., a land grid array socket or zero insertion force socket).

In one specific example, the component type is a memory module, and the method includes monitoring a plurality of operating parameters selected from power on time, power on/off cycles, temperature and memory speed. Most preferably, for any given component type, the selection of operating parameters to be monitored may include those operating parameters that are most closely related to the most likely failures of the component type.

Use of the first component may be reduced in any manner. Non-limiting examples of reducing use of the first component include placing the first component in an idle state or prioritizing use of other components of the same type. In one specific example, a compute node may include multiple memory modules, such that reducing use of a first component from among the multiple components includes reducing use of a first memory module relative to other memory modules within the compute node, wherein the first memory module has a stress factor score that is greater than the stress factor score for any of the other memory modules. Optionally, the step of reducing use of the first memory module relative to other memory modules within the compute node may include reprogramming a memory channel configuration to change an order in which memory channels are used. Accordingly, a first memory channel including the first memory module may be moved down in an order of memory channel usage. In a separate option, the step of reducing use of the first memory module relative to other memory modules within the compute node may include (logically) removing the first memory module from use. After the first memory module has been (logically) removed, the method may further include putting the first memory module back in use only in response to failure of one of the other memory modules. In other words, the first memory module may be kept available as a spare.

In addition to reducing use of the first component, the method may further comprise increasing use of a second component from among the multiple components, wherein the second component has a stress factor score that is less than the stress factor score for any of the other components of the same component type. Accordingly, a greater portion of a workload is shifted away from the first component to the second component having a lower stress factor score. In this manner, the first component, which has a higher stress factor score and is more likely to fail, is used less and the second component, which has a lower stress factor score and is less likely to fail, is used more.

In an alternatively embodiment, the method may further comprise prioritizing use of each of the multiple components in an order of ascending stress factor score. Therefore, among the multiple components of the same component type, the highest priority (most use) is given to the component with the lowest stress factor score, and increasing degrees of priority (use) are given to components with successively greater stress factor scores.

The stress factor score may be a function of any combination of operating parameters of the component and may use any mathematical equation or formula. For example, the stress factor score may include a cumulative total number of occurrences (a "count") of one or more event types, such as a given error type. Many component types will experience an increasing number of errors as the component ages prior to outright failure. Optionally, the stress factor score may be determined by weighting a cumulative total number of occurrences of a first event type differently than a cumulative total number of occurrences of a second event type. However, the plurality of parameters used to determine the stress factor score may or may not include a "count" of some event, and may use parameters other than "counts" or a combination of a count and at least one other parameter.

In a further embodiment, the method may further comprise periodically writing an updated value of the stress factor score to non-volatile memory on each component. For example, the non-volatile memory may be an electronically erasable programmable read-only memory (EEPROM) secured to the component. By periodically writing the updated value of the stress factor score to non-volatile memory on the component, the previous stress factor score will continue to be associated with the component even if the component is removed from an original compute node and reinstalled in another compute node. Accordingly, the stress factor score may be representative of the cumulative stress that a component has experienced over its entire lifetime. In a specific example, the updated value of the stress factor score is equal to a stress factor score previously stored in the non-volatile memory plus a stress factor score accumulated since the previously stored stress factor score. In this manner, the previous total stress factor score is read from the non-volatile memory, a marginal stress factor score is added to the previous total, and the updated stress factor score is written to the non-volatile memory. Alternatively, component usage data may be monitored and maintained by the operating system or by the management module.

Another embodiment of the present invention provides a computer program product comprising a non-transitory computer readable storage medium having program instructions embodied therewith, the program instructions being executable by a processor to cause the processor to perform a method. The method comprises monitoring a plurality of operating parameters for each of multiple components of a compute node, wherein the multiple components have the same component type, and determining a stress factor score for each of the multiple components, wherein the stress factor score is a function of the plurality of operating parameters. The method further comprises reducing use of a first component from among the multiple components, wherein the first component has a stress factor score that is greater than the stress factor score for any of the other components of the same component type.

The foregoing computer program products may further include computer readable program code for implementing or initiating any one or more aspects of the methods described herein. Accordingly, a separate description of the methods will not be duplicated in the context of a computer program product.

FIG. 1 is a diagram of a compute node or server 10 that is capable of implementing the methods of the present invention. In this non-limiting example, the compute node 10 includes a processor unit 21 that is coupled to a system bus 22. The processor unit 21 may utilize one or more processors, each of which has one or more processor cores. A video adapter 23, which drives/supports a display 24, is also coupled to the system bus 22. The system bus 22 is coupled via a bus bridge 25 to an input/output (I/O) bus 26. An I/O interface 27 is coupled to the I/O bus 26 and provides communication with various I/O devices, including a keyboard 28, a mouse 29, a media tray 30 (which may include storage devices such as CD-ROM drives, multi-media interfaces, etc.), a printer 32, and USB port(s) 34. As shown, the compute node 10 is able to communicate with other network devices, such as the media/content sources 13, via the network 12 using a network adapter or network interface controller 35.

A hard drive interface 36 is also coupled to the system bus 22. The hard drive interface 36 interfaces with a hard drive 37. In a preferred embodiment, the hard drive 37 communicates with system memory 40, which is also coupled to the system bus 22. System memory includes the lowest level of volatile memory in the compute node 20. This volatile memory may include additional higher levels of volatile memory (not shown), including, but not limited to, cache memory, registers and buffers. Data that populates the system memory 40 includes the operating system (OS) 42 and application programs 45.

The operating system 42 includes a shell 43 for providing transparent user access to resources such as application programs 45. Generally, the shell 43 is a program that provides an interpreter and an interface between the user and the operating system. More specifically, the shell 43 executes commands that are entered into a command line user interface or from a file. Thus, the shell 43, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 44) for processing. Note that while the shell 43 is a text-based, line-oriented user interface, the present invention will equally well support other user interface modes, such as graphical, voice, gestural, etc.

As depicted, the operating system 42 also includes the kernel 44, which includes lower levels of functionality for the operating system 42, including providing essential services required by other parts of the operating system 42 and application programs 45, including memory management, process and task management, disk management, and mouse and keyboard management. The application programs 45 in the system memory of the compute node 20 may include, without limitation, component wear-leveling logic 47 in accordance with various embodiments of the present invention. One example of the component wear-leveling logic 47 is the method 50 of FIG. 3.

The hardware elements depicted in the compute node 10 are not intended to be exhaustive, but rather are representative. For instance, the compute node 10 may include alternate memory storage devices such as magnetic cassettes, digital versatile disks (DVDs), Bernoulli cartridges, and the like. These and other variations are intended to be within the scope of the present invention.

Figure 2:
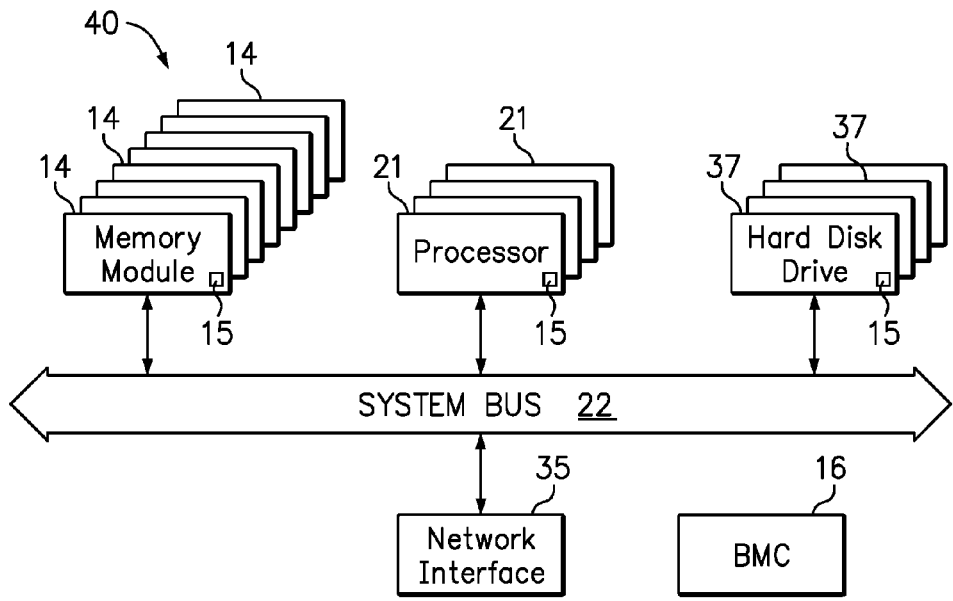
FIG. 2 is a simplified diagram of a compute node having multiple components of the same component type.

FIG. 2 is a simplified diagram of the compute node 10 having multiple components of the same component type. In this non-limiting example, the compute node 10 includes eight (8) memory modules 14 that form the system memory 40, four processors 21, and four hard disk drives 37 in communication with the system bus 22 that also communicates with the network interface 35. An optional EEPROM 15 is shown as a part of each of the memory modules 14, processors 21 and hard disk drives 37. Accordingly, embodiments of the methods discloses herein may be implemented to wear-level components of the same component type, such as wear-leveling the memory modules 14, wear-leveling the processors 21, and/or wear-leveling the hard disk drives 37. In accordance with certain embodiments, the compute node 10 may further include a management module, such as a baseboard management controller (BMC) 16, which monitors various operating parameters of the components.

Figure 3:
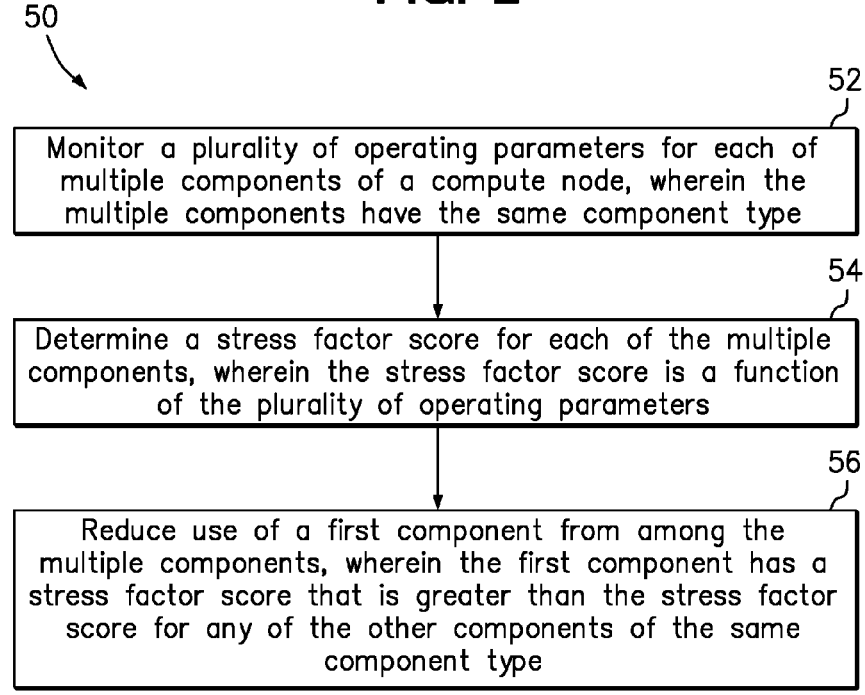
FIG. 3 is a flowchart of a method according to one embodiment of the present invention.

FIG. 3 is a flowchart of a method 50 according to one embodiment of the present invention. In step 52, the method monitors a plurality of operating parameters for each of multiple components of a compute node, wherein the multiple components have the same component type. In step 54, the method determines a stress factor score for each of the multiple components, wherein the stress factor score is a function of the plurality of operating parameters. Then, in step 56, the method reduces use of a first component from among the multiple components, wherein the first component has a stress factor score that is greater than the stress factor score for any of the other components of the same component type.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as program instructions in a computer readable storage medium that can direct a computer, other programmable data processing apparatus, or other devices to function in a particular manner, such that the program instructions stored in the computer readable storage medium produce an article of manufacture including program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
monitoring a plurality of operating parameters for each of multiple memory modules of a compute node;
determining a stress factor score for each of the multiple memory modules, wherein the stress factor score is a function of the plurality of operating parameters; and
reducing use of a first memory module relative to other memory modules within the compute node including reprogramming a memory channel configuration within the compute node to change an order in which memory channels are used, wherein the stress factor score determined for the first memory module is greater than the stress factor score determined for any of the other memory modules.

2. The method of claim 1, further comprising:
increasing use of a second memory module from among the multiple memory modules, wherein the stress factor score determined for the second memory module is less than the stress factor score for any of the other memory modules.

3. The method of claim 1, further comprising:
prioritizing use of each of the multiple memory modules in an order of ascending stress factor score determined for the respective one of the memory modules.

4. The method of claim 1, wherein reducing use of the first memory module from among the multiple memory modules includes placing the first memory module in an idle state.

5. The method of claim 1, wherein the plurality of operating parameters are selected from on/off cycles, thermal average, read/write cycles, usage time, correctable error count, uncorrectable error count, memory training time during power-on self-test, and memory training error count during power-on self-test.

6. The method of claim 1, wherein the stress factor score determined for each of the multiple memory modules is a cumulative total number of occurrences of one or more event types.

7. The method of claim 6, wherein the stress factor score determined for each of the multiple memory modules is determined by weighting a cumulative total number of occurrences of a first event type differently than a cumulative total number of occurrences of a second event type.

8. The method of claim 1, wherein each of the multiple memory modules is a pluggable memory module.

9. The method of claim 1, wherein the plurality of operating parameters are selected from power on time, power on/off cycles, and memory speed.

10. The method of claim 9, wherein the plurality of operating parameters are monitored by an operating system of the compute node.

11. The method of claim 1, wherein a first memory channel including the first memory module is moved down in an order of memory channel usage.

12. The method of claim 1, wherein reducing use of the first memory module relative to the other memory modules within the compute node includes removing the first memory module from use.

13. The method of claim 12, further comprising:
putting the first memory module back in use only in response to failure of one of the other memory modules.

14. The method of claim 1, further comprising:
periodically determining and writing an updated value of the stress factor score for each of the multiple memory modules to non-volatile memory on a respective one of the memory modules.

15. The method of claim 14, wherein the updated value of the stress factor score for each of the multiple memory modules is equal to a stress factor score previously stored in the non-volatile memory on the respective one of the multiple memory modules plus a stress factor score accumulated since the previously stored stress factor score for the respective one of the multiple memory modules.

16. A computer program product comprising a non-transitory computer readable storage medium having program instructions embodied therewith, the program instructions being executable by a processor to cause the processor to:
   monitor a plurality of operating parameters for each of multiple memory modules of a compute node;
   determine a stress factor score for each of the multiple memory modules, wherein the stress factor score is a function of the plurality of operating parameters; and
   reduce use of a first memory module relative to other memory modules within the compute node including reprogramming a memory channel configuration within the compute node to change an order in which memory channels are used, wherein the stress factor score determined for the first memory module is greater than the stress factor score determined for any of the other memory modules.

17. The computer program product of claim 16, the program instructions being executable by the processor to further cause the processor to:
   increase use of a second memory module from among the multiple memory modules, wherein the stress factor score determined for the second memory module is less than the stress factor score for any of the other memory modules.

18. The computer program product of claim 16, the program instructions being executable by the processor to further cause the processor to:
   prioritize use of each of the multiple memory modules in an order of ascending stress factor score determined for the respective one of the memory modules.

19. The computer program product of claim 16, wherein the plurality of operating parameters are selected from power on time, power on/off cycles, and memory speed.

20. The computer program product of claim 16, wherein a first memory channel including the first memory module is moved down in an order of memory channel usage.

* * * * *